United States Patent
Dodin et al.

(10) Patent No.: US 10,370,256 B2
(45) Date of Patent: Aug. 6, 2019

(54) METHOD FOR PREPARING A NANOMETRIC ZEOLITE Y

(71) Applicant: IFP Energies nouvelles, Rueil-Malmaison (FR)

(72) Inventors: Mathias Dodin, Molsheim (FR); Nicolas Bats, Saint Symphorien D'ozon (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 20 days.

(21) Appl. No.: 15/542,273

(22) PCT Filed: Jan. 7, 2016

(86) PCT No.: PCT/EP2016/050201
§ 371 (c)(1),
(2) Date: Jul. 7, 2017

(87) PCT Pub. No.: WO2016/110534
PCT Pub. Date: Jul. 14, 2016

(65) Prior Publication Data
US 2018/0009670 A1    Jan. 11, 2018

(30) Foreign Application Priority Data
Jan. 8, 2015    (FR) ..................................... 15 50149

(51) Int. Cl.
*C01B 39/24*    (2006.01)
*B01J 29/70*    (2006.01)
(Continued)

(52) U.S. Cl.
CPC ........... *C01B 39/24* (2013.01); *B01J 29/7007* (2013.01); *C01B 39/20* (2013.01); *B01J 37/04* (2013.01); *B01J 37/10* (2013.01); *C01P 2004/64* (2013.01)

(58) Field of Classification Search
CPC ... C01B 39/24; C01P 2004/64; B01J 29/7007; B01J 37/04; B01J 37/10
See application file for complete search history.

(56) References Cited

U.S. PATENT DOCUMENTS 3,690,823 A    9/1972    Young

FOREIGN PATENT DOCUMENTS

| CN | 101767799 A | 7/2010 |
| CN | 104118885 A | 10/2014 |

OTHER PUBLICATIONS

Robson et al, "Verified Synthesis of Zeolite Materials", 2nd revised edition, Elsevier {2001} (Year: 2001).*

(Continued)

*Primary Examiner* — David M Brunsman
(74) *Attorney, Agent, or Firm* — Millen, White, Zelano and Branigan, P.C.

(57) ABSTRACT

Preparation of a FAU-structural-type nanometric zeolite Y having a crystal size of less than 100 nm and an Si/Al ratio that is greater than 2: mixing, in aqueous medium, of at least one $AO_2$ source of at least one tetravalent element A that is silicon, germanium, and/or titanium, at least one $BO_b$ source of at least one trivalent element B that is aluminum, boron, iron, indium, and/or gallium, at least one $C_{2/m}O$ source of an alkaline metal or alkaline-earth metal C that is lithium, sodium, potassium, calcium, and/or magnesium the $C_{2/m}O$ source also having at least one hydroxide ion source obtaining a gel, curing of the gel after at least 3 days of curing, with addition of at least one source of at least one tetravalent element A and the hydrothermal treatment of the gel obtained at a to achieve crystallization of the FAU-structural-type nanometric zeolite Y.

16 Claims, 1 Drawing Sheet

°2θ (θ/2θ coupled)    λ = 1.54060 Å

(51) Int. Cl.
    *C01B 39/20*     (2006.01)
    *B01J 37/10*     (2006.01)
    *B01J 37/04*     (2006.01)

(56) References Cited

OTHER PUBLICATIONS

International Search Report PCT/EP2016/050201 dated Mar. 18, 2016.

Julide Koroglu H et al: "Effects of low-temperature gel aging on the synthesis of zeolite Y at different alkalinities", Journal of Crystal Growth, Elsevier, Amsterdam, NL, vol. 241, No. 4, Jun. 1, 2002 (Jun. 1, 2002), pp. 481-488, XP004360673, ISSN: 0022-0248.

\* cited by examiner

°2θ (θ/2θ coupled)    λ = 1.54060 Å

°2θ (θ/2θ coupled)    λ = 1.54060 Å

US 10,370,256 B2

METHOD FOR PREPARING A NANOMETRIC ZEOLITE Y

This application is a 371 filing of PCT/EP2016/050201, filed Jan. 1, 2016.

TECHNICAL FIELD

This invention relates to a new method for preparation of a FAU-structural-type zeolite Y whose crystal size is less than 100 nm and that is called "nanometric zeolite" throughout the text and that has an Si/Al structure ratio of greater than 2, in the absence of an organic structuring radical, and with the addition during the curing step of a source of a tetravalent element A (A=Si). Said FAU-structural type nanometric zeolite Y is advantageously used as a catalyst, adsorbent or separating agent.

PRIOR ART

The zeolites, or molecular sieves, are crystalline materials that consist of a three-dimensional arrangement of interconnected $TO_4$ tetrahedra (T can represent Si, Al, B, P, Ge, Ti, Ga, Fe, for example). The organization of the $TO_4$ elements creates an ordered network of micropores that consists of channels and cavities whose dimensions are compatible with the small organic molecules. According to the manner in which the framework atoms are placed, different zeolitic structures are distinguished (at this time, there are more than 220 thereof [http://www.iza-structure.org/databases]). Each structure therefore has a characteristic crystalline network that can be identified by its X-ray diffraction diagram.

The applications of zeolites are numerous and relate to fields such as catalysis, adsorption, ion exchange or else purification. The use of a zeolite is conditioned by the characteristics of its porous network (dimensions, etc.) and its chemical composition. An aluminosilicic zeolite has a negatively-charged framework, because of the charge deficit provided by each aluminum atom in relation to the silicon, and which therefore requires the presence of easily exchangeable compensation cations ($Na^+$, $K^+$, etc.). When the latter are replaced, partially or totally, by ammonium cations $NH_4^+$, it is then possible to calcinate the zeolite so as to obtain an acid structure (the $NH_4^+$ are transformed into $H^+$ by elimination of $NH_3$). Such materials are then used in acid catalysis, where their activity and their selectivity will depend on the force of the acid sites, their density and their location, as well as their accessibility.

The currently used primary zeolites include the FAU-structural-type zeolites, which are used in numerous industrial methods, such as, for example, the catalytic cracking of the heavy petroleum fractions. These zeolites exist in the natural state: faujasite was described for the first time in 1842 following its discovery in Germany [A. Damour, *Annales des Mines* [Mine Annals] 4 (1842) 395], but it was no more than a century later that it was obtained for the first time in the laboratory. In the synthetic state, two forms are distinguished: the zeolite X having an Si/Al structure ratio of between 1 and 1.5 [R. M. Milton, Brevet [Patent] U.S. Pat. No. 2,882,244, 1959] and the zeolite Y for which the Si/Al ratio is greater than 1.5 [D. W. Breck, Brevet [Patent] U.S. Pat. No. 3,130,007, 1964].

The face-centered cubic structure with 192 $TO_4$ tetrahedra (Fd-3m space group) of the faujasite was resolved in 1958 [G. Bergerhoff, W. H. Baur, W. Nowaki, *Neues Jahrb. Mineral. Monatsh.* [*New Monthly Mineral. Almanac*] 9 (1958) 193] and can be described as an assembly of sodalite cages, consisting of 24 tetrahedra, connected to one another by 6-6 construction units ("6" or "d6r double cycles") according to an inversion-center symmetry. The mesh parameter a0 of the faujasite can vary between 24.2 and 24.8 Å according to the Si/Al framework ratio [D. W. Breck, E. M. Flanigen, *Molecular Sieves*, Society of Chemical Industry, London (1968) 47; J. R. Sohn, S. J. DeCanio, J. H. Lunsford, D. J. O'Donnell, *Zeolites* 6 (1986) 225; H. Fichtner-Schmittler, U. Lohse, G. Engelhardt, V. Patzelova, *Cryst. Res. Technol.* 19 (1984)]. Inside the structure, the arrangement of tetrahedra gives rise to supercages with a maximum diameter of 11.6 Å and acting on nanoreactors that are adapted to the cracking of hydrocarbons and the adsorption of gas; furthermore, the pores of the faujasite, with a diameter of 7.4 Å for 12 TO4 tetrahedra, make possible a proper diffusion of molecules within the porous network [C. Baerlocher, L. B. McCusker, D. H. Olson, *Atlas of Zeolite Framework Type, $6^{th}$ Revised Edition*, Elsevier (2007)].

One objective of this invention is to provide a method for preparation of a FAU-structural-type zeolite Y that has nanometric dimensions. The zeolites of nanometric dimensions have a strong advantage in catalysis due to their enhanced diffusion properties: contrary to the zeolites of micrometric dimensions in which the length of the intracrystalline diffusional paths entrains a restriction of the catalytic performances [Y. Tao, H. Kanoh, L. Abrams, K. Kaneko, *Chem. Rev.* 106 (2006) 896] and a gradual deactivation of the catalyst [K. Na, M. Choi, R. Ryoo, *Micro. Meso. Mater.* 166 (2013) 3], the nanometric zeolites display gains in activity and in selectivity [D. Karami, S. Rohani, Petroleum Science and Technology 31 (2013) 1625; Q. Cui, Y. Zhou, Q. Wei, X. Tao, G. Yu, Y. Wang, J. Yang, *Energy & Fuels* 26 (2012) 4664]. This invention makes it possible to obtain a FAU-structural-type zeolite Y whose crystals have dimensions smaller than 100 nanometers.

One advantage of the preparation method according to the invention is to make it possible to obtain such a FAU-structural-type nanometric zeolite Y that has both a crystal size of less than 100 nm and a high Si/Al ratio and in particular a ratio that is greater than 2, prepared by the method according to the invention, with a very good crystallinity, in relation to the conventional methods of the prior art that do not make it possible to obtain the zeolite Y with a high Si/Al ratio.

SUMMARY OF THE INVENTION

This invention has as its object a method for preparation of a FAU-structural-type nanometric zeolite Y that has a crystal size of less than 100 nm and an Si/Al ratio of greater than 2, preferably greater than 2.3, in a preferred manner greater than 2.5, and in a very preferred manner greater than 2.6, with said method comprising at least the following steps:

i) The mixing, in aqueous medium, of at least one $AO_2$ source of at least one tetravalent element A that is selected from among silicon, germanium, titanium by itself or in a mixture, at least one $BO_b$ source of at least one trivalent element B that is selected from among aluminum, boron, iron, indium, gallium, by itself or in a mixture, at least one $C_{2/m}O$ source of an alkaline metal or alkaline-earth metal C selected from among lithium, sodium, potassium, calcium, magnesium by itself or in a mixture, with said $C_{2/m}O$ source of alkaline metal or alkaline-earth metal C also comprising at least one hydroxide ion source for obtaining a gel, with the reaction mixture having the following molar composition:

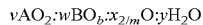
$$vAO_2:wBO_b:x_{2/m}O:yH_2O$$

with v being between 1 and 40, preferably between 1 and 20, and in a very preferred manner between 15 and 20, with w being between 0.1 and 5, preferably between 0.2 and 1.5, with x being between 1 and 40, preferably between 1 and 20, with y being between 30 and 1000, preferably between 100 and 400, with b being between 1 and 3, b being a whole number or a rational number, with m being equal to 1 or 2, ii) the curing of the gel that is obtained at the end of step (i) at a temperature of between −15° C. and 60° C., in a preferred manner between 0° C. and 50° C., and in a very preferred manner between 20 and 40° C., with or without stirring, for a time period of between 1 and 60 days, and preferably between 3 and 30 days, in a very preferred manner between 5 and 30 days, and in an even more preferred manner between 5 and 20 days, iii) after at least 3 days of curing, the one-time or repeated addition of at least one $AO_2$ source of at least one tetravalent element A that is selected from among silicon, germanium, titanium, by itself or in a mixture, in said gel, with the molar composition of the gel at the end of the addition being as follows:

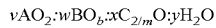
$$vAO_2:wBO_b:xC_{2/m}O:yH_2O$$

with v being between 5 and 50, preferably between 10 and 35, and in a very preferred manner between 20 and 30, with w being between 0.1 and 5, preferably between 0.2 and 1.5, with x being between 1 and 40, preferably between 1 and 20, with y being between 200 and 1000, preferably between 200 and 500, with b being between 1 and 3, b being a whole number or a rational number, with m being equal to 1 or 2, (iv) the hydrothermal treatment of the gel that is obtained at the end of step (iii) at a temperature of between 20° C. and 200° C., preferably between 40° C. and 140° C., in a preferred manner between 50° C. and 100° C., and in a very preferred manner between 60 and 80° C., under autogenous reaction pressure, for a time period of between 1 hour and 14 days, preferably between 6 hours and 7 days, preferably between 10 hours and 3 days, and in a very preferred manner between 16 hours and 24 hours, to achieve the crystallization of said FAU-structural-type nanometric zeolite Y.

This invention therefore makes it possible to obtain a FAU-structural-type zeolite Y that has both a crystal size of less than 100 nm and an Si/Al ratio that is greater than 2 due to the implementation of a curing step in which the addition of a source of a tetravalent element A that is selected from among silicon, germanium, titanium, by itself or in a mixture, is initiated.

DESCRIPTION OF THE INVENTION

In accordance with the invention, at least one $AO_2$ source of at least one tetravalent element A is incorporated in step (i) of the preparation method. According to the invention, A is selected from among silicon, germanium, titanium, and the mixture of at least two of these tetravalent elements, and very preferably A is silicon. The source(s) of said tetravalent element(s) A can be any compound that comprises the element A and that can release this element in aqueous solution in reactive form. The element A is incorporated in the mixture in an $AO_2$ oxidized form or in any other form. When A is titanium, $Ti(EtO)_4$ is advantageously used as a titanium source. When A is germanium, amorphous $GeO_2$ is advantageously used as a germanium source. In the preferred case where A is silicon, the silicon source can be any one of said sources that are commonly used for the synthesis of zeolites, for example silica in powder form, silicic acid, colloidal silica, dissolved silica, or tetraethoxysilane (TEOS). Among the silicas in powder form, it is possible to use precipitated silicas, in particular those obtained by precipitation from an alkaline metal silicate solution, pyrogenated silicas, for example "CAB-O-SIL" and silica gels. It is possible to use colloidal silicas that have different particle sizes, for example with a mean equivalent diameter of between 10 and 15 nm or between 40 and 50 nm, such as those marketed under the filed trademarks such as "LUDOX." In a preferred manner, the silicon source is LUDOX.

In accordance with the invention, at least one $C_{2/m}O$ source of an alkaline metal or alkaline-earth metal C is incorporated in step (i) of the preparation method. According to the invention, C is one or more alkaline metal(s) and/or alkaline-earth metal(s) preferably selected from among lithium, sodium, potassium, calcium, magnesium and the mixture of at least two of these metals, and in a very preferred manner, C is sodium. The $C_{2/m}O$ source(s) of said one alkaline metal or alkaline-earth metal C can be any compound that comprises the element C and that can release this element in aqueous solution in the reactive form.

In accordance with the invention, said $C_{2/m}O$ source of alkaline metal or alkaline-earth metal C can also release at least one hydroxide ion source in aqueous solution.

Preferably, the $C_{2/m}O$ source of an alkaline metal or alkaline-earth metal C also comprising at least one hydroxide ion source is selected from among lithium hydroxide, sodium hydroxide, potassium hydroxide, calcium hydroxide, and magnesium hydroxide, by itself or in a mixture.

In accordance with the invention, at least one $BO_b$ source of at least one trivalent element B is added in the mixing step (i) of the preparation method. According to the invention, said trivalent element B is selected from among aluminum, boron, iron, indium, gallium, or the mixture of at least two of these trivalent elements, and very preferably B is aluminum. The source(s) of said trivalent element(s) B can be any compound comprising the element B and that can release this element in aqueous solution in reactive form. The element B can be incorporated into the mixture in a $BO_b$ oxidized form with $1 \leq b \leq 3$ (with b being a whole number or a rational number) or in any other form. In the preferred case where B is aluminum, the aluminum source is preferably sodium aluminate or an aluminum salt, for example chloride, nitrate, hydroxide or sulfate, an aluminum alkoxide, or alumina itself, preferably in hydrated or hydratable form, such as, for example, colloidal alumina, pseudo-boehmite, gamma-alumina or alpha-trihydrate or beta-trihydrate. It is also possible to use mixtures of sources cited above.

In accordance with the invention, the different sources are added in the mixing step (i) in such a way that the reaction mixture has the following molar composition:

$$vAO_2:wBO_b:xC_{2/m}O:yH_2O$$

with v being between 1 and 40, preferably between 1 and 20, and in a very preferred manner between 15 and 20, with w being between 0.1 and 5, preferably between 0.2 and 1.5, with x being between 1 and 40, preferably between 1 and 20, with y being between 30 and 1000, preferably between 100 and 400, with b being between 1 and 3, b being a whole number or a rational number, with m being equal to 1 or 2, where A, B and C have the same definition as above, namely A is one or more tetravalent element(s) selected from the group that is formed by the following elements: silicon, germanium, titanium, in a very preferred manner A is silicon; where B is one or more trivalent element(s) selected from the group that is formed by the following elements: aluminum, iron, boron, indium, and gallium, in a very preferred manner B is aluminum; where C is one or more alkaline metal(s) and/or alkaline-earth metal(s) selected from among lithium, sodium, potassium, calcium, magnesium, and the mixture of at least two of these metals, in a very preferred manner, C is sodium.

Preferably, said mixing step (i) is carried out in the absence of organic structuring agent.

Step (i) of the method according to the invention consists in preparing an aqueous reaction mixture called a gel and containing at least one $AO_2$ source of at least one tetravalent element A, at least one $BO_b$ source of at least one trivalent element B, B preferably being aluminum, at least one $C_{2/m}O$ source of an alkaline metal or alkaline-earth metal C, with C preferably being sodium. The quantities of said reagents are adjusted in such a way as to impart to this gel a composition that makes possible its crystallization into a FAU-structural-type nanometric zeolite Y.

It may be advantageous to add seeds to the reaction mixture during said step (i) of the method of the invention so as to reduce the time necessary to the formation of FAU-structural-type nanometric zeolite Y crystals and/or the total crystallization period. Said seeds also promote the formation of said FAU-structural-type zeolite Y at the expense of impurities. Such seeds comprise crystallized solids, preferably FAU-structural-type zeolite crystals. The crystalline seeds are generally added in a proportion of between 0.01 and 10% of the mass of the source of the element A, preferably of the oxide $AO_2$, used in the reaction mixture.

Step (ii) of the method according to the invention consists in carrying out a curing of the gel that is obtained at the end of the mixing step (i). Said curing step can be carried out with or without stirring, in a static state. In the case where said step is carried out while being stirred, it is preferably carried out while being stirred magnetically or mechanically, with a stirring speed of between 0 and 1000 rpm. Said curing step is advantageously performed at a temperature of between −15° C. and 60° C., in a preferred manner between 0° C. and 50° C., and in a very preferred manner between 20 and 40° C., for a period of between 1 and 60 days, and preferably between 3 and 30 days, in a very preferred manner between 5 and 30 days, and in an even more preferred manner between 5 and 20 days.

In accordance with step (iii) of the method according to the invention, after at least 3 days of curing, at least one $AO_2$ source of at least one tetravalent element A selected from among silicon, germanium, titanium, by itself or in a mixture, is added to the gel that is obtained at the end of the mixing step (i). The addition can advantageously be carried out during or after the curing step (ii).

In the case where the addition is carried out during the curing step (ii), the addition is preferably carried out after at least 5 days of curing.

The addition can be repeated one or more times, with an identical or different quantity. Said repeated additions can be spaced by a period of between 5 minutes and 3 days, and preferably between 12 and 24 hours. A has the same definition as above, namely A is one or more tetravalent element(s) selected from the group that is formed by the following elements: silicon, germanium, titanium, and in a very preferred manner A is silicon. The source(s) of said tetravalent element(s) A can be any compound that comprises the element A and that can release this element in aqueous solution in reactive form. The element A can be incorporated in the mixture in an $AO_2$ oxidized form or in any other form.

Preferably, the tetravalent element A that is added in the curing step (iii) of the method according to the invention can be identical to or different from the tetravalent element A that is added in the mixing step (i) and preferably identical.

In the preferred case where A is silicon, the silicon source can be any one of said sources that are commonly used for the synthesis of zeolites and described in the mixing step (i).

At the end of the addition in accordance with step (iii), the molar composition of the gel is as follows:

$$vAO_2:wBO_b:xC_{2/m}O:yH_2O$$

with v being between 5 and 50, preferably between 10 and 35, and in a very preferred manner between 20 and 30, with w being between 0.1 and 5, preferably between 0.2 and 1.5, with x being between 1 and 40, preferably between 1 and 20, with y being between 200 and 1000, preferably between 200 and 500, with b being between 1 and 3, b being a whole number or a rational number, with m being equal to 1 or 2.

In accordance with step (iv) of the method according to the invention, the gel that is obtained at the end of step (iii) for addition of a source of at least one tetravalent element A is subjected to a hydrothermal treatment, carried out at a temperature of between 20° C. and 200° C., preferably between 40° C. and 140° C., in a preferred manner between 50° C. and 100° C., and in a very preferred manner between 60 and 80° C., under autogenous reaction pressure, for a period of between 1 hour and 14 days, preferably between 6 hours and 7 days, preferably between 10 hours and 3 days, and in a very preferred manner between 16 hours and 24 hours, to achieve the crystallization of said FAU-structural-type nanometric zeolite Y. The gel is advantageously put under hydrothermal conditions under an autogenous reaction pressure, optionally by adding gas, for example nitrogen. Step (iv) of the preparation method according to the invention is carried out in a static state or while being stirred.

At the end of the reaction, when said FAU-structural-type nanometric zeolite Y is formed following the implementation of said step (iv) of the preparation method of the invention, the solid phase formed of the FAU-structural-type nanometric zeolite Y is advantageously filtered, washed, and then dried. The drying is preferably carried out at a temperature of between 20° C. and 150° C., preferably between 70° C. and 120° C., for a period of between 5 and 20 hours. The FAU-structural-type nanometric zeolite Y, dried, is generally analyzed by X-ray diffraction, with this technique also making it possible to determine the purity of said zeolite that is obtained by the method of the invention. In a very advantageous manner, the method of the invention leads to the formation of a pure FAU-structural-type nanometric zeolite Y, in the absence of any other crystallized or amorphous phase. Said FAU-structural-type nanometric zeolite Y, obtained at the end of step (iv) and optionally dried, is called a crude synthesis zeolite.

At the end of the drying step, said crude synthesis zeolite optionally undergoes at least one calcination step and at least one ion exchange step. For these steps, all of the conventional methods known to one skilled in the art can be used.

The calcination of the crude-synthesis FAU-structural-type nanometric zeolite Y that is obtained according to the method of the invention is preferably carried out at a temperature of between 500 and 700° C. and for a period of between 5 and 15 hours.

The preparation method according to the invention makes it possible to obtain a zeolite Y that has a crystal size of less than 100 nm, preferably less than 60 nm, and in a preferred manner less than 50 nm, and an Si/Al ratio of greater than 2, preferably greater than 2.3, in a preferred manner greater than 2.5, and in a very preferred manner greater than 2.6. The size of the zeolite crystals obtained is measured on one or more transmission electron microscopy images; it is the maximum size observed in the images.

As a general rule, the cation(s) C of the FAU-structural-type nanometric zeolite Y obtained by the method of the invention can be replaced by any one or more cation(s) of metals and in particular those of groups IA, IB, IIA, IIB, IIIA, IIIB (including the rare earths), VIII (including the noble metals) as well as by lead, tin, and bismuth by an ion exchange step. Said ion exchange step is carried out by means of any water-soluble salts that contain the appropriate cation.

It is also advantageous to obtain the hydrogen form of the FAU-structural-type nanometric zeolite Y obtained by the preparation method according to the invention. Said hydrogen form can be obtained by carrying out an ion exchange with an acid, in particular a strong mineral acid such as hydrochloric acid, sulfuric acid, or nitric acid, or with a compound such as ammonium chloride, ammonium sulfate, or ammonium nitrate. Said ion exchange step can advantageously be carried out by putting said FAU-structural-type nanometric zeolite Y in suspension in one or more steps with the ion exchange solution. Said zeolite can be calcined before or after the ion exchange step or between two ion exchange steps. The calcination of said zeolite after the ion exchange step(s) makes it possible to obtain the acid form therefrom. Said acid form of the nanometric zeolite can advantageously be used for catalysis applications.

The structure of said material is identified by X-ray diffractometry in the diffraction angle range 2θ=5° to 40° 0.02°, in reflection geometry. The X-ray source is a copper anticathode fed at a voltage of 40 kV and an intensity of 40 mA, and providing a monochromatic radiation Cu–Kα1 (λ=1.5406 Å). Said FAU-structural-type zeolite Y obtained by the method according to the invention advantageously has an X-ray diffraction diagram that includes at least the lines that are recorded in the table corresponding to the X-ray diffraction diagram of the zeolite below:

| Interreticular Distance (Å) | Intensity (%) |
|---|---|
| 14.11 | F |
| 8.68 | f |
| 7.40 | f |
| 5.63 | m |
| 4.72 | f |
| 4.35 | mf |
| 3.87 | f |
| 3.75 | FF |
| 3.44 | ff |
| 3.29 | F |
| 3.01 | mf |
| 2.89 | m |
| 2.85 | FF |
| 2.75 | mf |
| 2.62 | f |
| 2.37 | f |
| 2.18 | f |
| 2.09 | ff |

FF = very high;
F = high;
m = medium;
mf = medium-low;
f = low;
ff = very low

The relative intensity I/I0 is provided in relation to a relative intensity scale where a value of 100 is attributed to the most intense line of the X-ray diffraction diagram: ff<15; 15≤f<30; 30≤mf<50; 50≤m<65; 65≤F<85; FF≥85.

The zeolite that is obtained by the method of the invention can be used after ion exchange as an acid solid for catalysis, i.e., as a catalyst in the fields of refining and petrochemistry. It can also be used as an adsorbent for pollution control or as a molecular sieve for separation.

For example, when it is used as a catalyst, the zeolite that is prepared according to the method of the invention is calcined, exchanged, and is preferably in hydrogen form, and can be associated with an inorganic matrix, which can be inert or catalytically active, and with a metal phase. The inorganic matrix can be present simply as a binder to keep together the small particles of the zeolite under the different known forms of catalysts (extrudates, pellets, balls, powders) or else can be added as a diluent for dictating the degree of conversion in a method that would otherwise proceed at too quick a pace, leading to fouling of the catalyst due to excessive coke formation. Typical inorganic matrices are in particular substrate materials for the catalysts such as silica, different forms of alumina, magnesia, zirconia, titanium oxide, boron oxide, zirconium oxide, aluminum phosphate, titanium phosphate, kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$, or any combination of these compounds. The inorganic matrix can be a mixture of different compounds, in particular an inert phase and an active phase.

The zeolite that is prepared according to the method of the invention can also be associated with at least one other zeolite and can play the role of main active phase or additive.

The metal phase is introduced into only the zeolite, only the inorganic matrix, or the zeolite-inorganic matrix structure by ion exchange or impregnation with cations or oxides selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir, or any other element of the periodic table.

The metals can be introduced either all in the same way or by different techniques, at any moment of the preparation, before or after shaping and in any order. In addition, intermediate treatments, such as, for example, a calcination and/or a reduction, can be applied between the deposits of different metals.

The catalytic compositions that comprise the FAU-structural-type nanometric zeolite Y that is prepared according to the method of the invention are suitable in a general way for implementing the primary method for transformation of hydrocarbons and reactions for synthesis of organic compounds such as the ethers.

Any shaping method known to one skilled in the art is suitable for the catalyst that comprises the FAU-structural-type nanometric zeolite Y. It will be possible to use, for example, the pelletizing or the extrusion or the shaping of balls. The shaping of the catalyst that contains the zeolite prepared according to the method of the invention and being at least in part in acid form is generally such that the catalyst is preferably in the form of extrudates or balls for the purpose of its use.

EXAMPLES

The invention is illustrated by the following examples that do not in any case have a limiting nature.

Example 1

Preparation of a FAU-Structural-Type Nanometric Zeolite X and an Si/Al Molar Ratio that is Equal to 1.4 According to a Method that is not in Compliance with the Invention A FAU-structural-type nanometric zeolite X that contains the elements Si and Al, with an Si/Al molar ratio equal to 1.4, is synthesized according to a preparation method known to one skilled in the art. Typically, the aluminum source (sodium aluminate, Strem Chemicals, 99%) and the mineralizing agent (sodium hydroxide, Fluka, 99%) are dissolved in deionized water, while being stirred. The silicon source (Ludox AS-40, 40%, Sigma Aldrich) is then added drop by drop, so as to obtain a reaction mixture whose molar composition is 15.2 $SiO_2$: 1 $Al_2O_3$: 17 $Na_2O$: 360 $H_2O$. The reaction mixture is continuously stirred vigorously for 17 days at ambient temperature. The product is then filtered and washed, before being dried in the oven for one night at 100° C. No silicon source or any other tetravalent element is added during the curing step.

Figure 1:
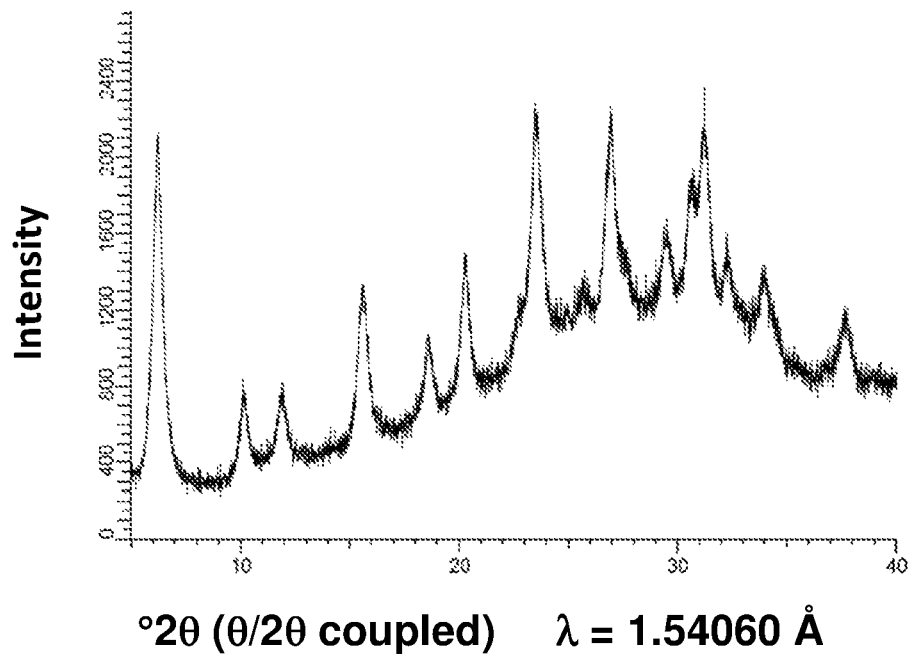
FIGS. 1 and 2 show the X-ray diffraction diagrams of the FAU-structural-type nanometric zeolites Y that are synthesized in Examples 1 and 2, in the diffraction angle range $2\theta=5°$ to $40°$.

The X-ray diffraction diagram of the material shown in FIG. 1 can be indexed in the cubic system of the FAU-structural-type zeolite. The analysis of the X-ray diffractogram provides an Si/Al molar ratio that is equal to 1.4 according to the Fichtner-Schmittler equation. These characteristics correspond to a FAU-structural-type zeolite X. The size of the zeolite crystals obtained, measured in 8 transmission electron microscopy images, is between 15 and 50 nm.

Example 2

Preparation of the FAU-Structural-Type Nanometric Zeolite Y and an Si/Al Molar Ratio Equal to 2.7 According to a Method in Compliance with the Invention A FAU-structural-type nanometric zeolite Y that contains the elements Si and Al, with an Si/Al molar ratio equal to 2.7, is synthesized according to a preparation method that is described in Example 1 relative to the mixing step (i). Typically, the aluminum source (sodium aluminate, Strem Chemicals, 99%) and the mineralizing agent (sodium hydroxide, Fluka, 99%) are dissolved in deionized water, while being stirred. The silicon source (Ludox AS-40, 40%, Sigma Aldrich) is then added drop by drop, so as to obtain a reaction mixture whose molar composition is 15.2 $SiO_2$: 1 $Al_2O_3$: 17 $Na_2O$: 360 $H_2O$. The gel that is thus formed is stirred vigorously at ambient temperature. At the end of 7 days of curing, a silicon source (Ludox AS-40, 40%, Sigma Aldrich) is added drop by drop. The operation is repeated the next day and the day after that. After the three additions of silicon source, the gel that is thus formed has the following composition: 25 $SiO_2$: 1 $Al_2O_3$: 18.4 $Na_2O$: 480 $H_2O$. The reaction mixture is continuously stirred vigorously for 4 additional days at ambient temperature, and then is transferred into a polypropylene flask. This flask is placed in an oven at 60° C. for 24 hours under autogenous pressure and without adding gas. After having cooled the flask to ambient temperature, the product is filtered and washed, before being dried in the oven for one night at 100° C.

Figure 2:
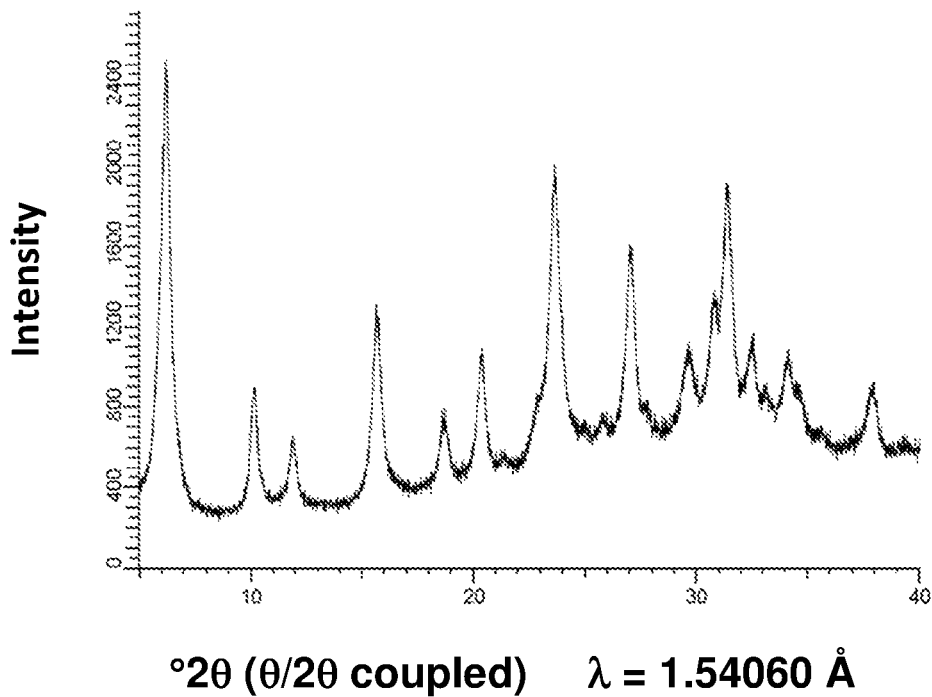

The X-ray diffraction diagram of the material shown in FIG. 2 can be indexed in the cubic system of the FAU-structural-type zeolite. The analysis of the X-ray diffractogram provides an Si/Al molar ratio that is equal to 2.7 according to the Fichtner-Schmittler equation. These characteristics also correspond to a FAU-structural-type zeolite Y. The size of the zeolite crystals obtained, measured in 8 transmission electron microscopy images, is between 15 and 50 nm.

Example 3

Not in Compliance with the Invention

According to a method that is not in compliance with the invention, there is prepared—from the first mixing step—a gel with a composition that is identical to the one described in Example 3 after the three additions of silicon source: 25 $SiO_2$: 1 $Al_2O_3$: 18.4 $Na_2O$: 480 $H_2O$. This gel is stirred vigorously at ambient temperature for 13 days, corresponding to the total curing period of the gel that is prepared in Example 3. The reaction mixture is then transferred into a polypropylene flask. This flask is placed in an oven at 60° C. for 24 hours under autogenous pressure and without the addition of gas. After having cooled the flask to ambient temperature, the product is filtered and washed, before being dried in the oven for one night at 100° C.

The X-ray diffraction diagram of the material shown in FIG. 4 shows that no crystallized product is formed at the end of the crystallization step at 60° C. The preparation method described in this example therefore does not make it possible to obtain a FAU-structural-type nanometric zeolite.

The invention claimed is:
1. A method for preparation of a FAU-structural nanometric zeolite Y that has a crystal size of less than 100 nm and an Si/Al ratio that is greater than 2, with said method comprising at least the following:

i) mixing, in aqueous medium, of at least one $AO_2$ source of at least one tetravalent element A that is silicon, germanium, or titanium, by itself or in a mixture, at least one $BO_b$ source of at least one trivalent element B that is aluminum, boron, iron, indium, or gallium, by itself or in a mixture, at least one $C_{2/m}O$ source of an alkaline metal or alkaline-earth metal C that is lithium, sodium, potassium, calcium, or magnesium, by itself or in a mixture, with said $C_{2/m}O$ source of alkaline metal or alkaline-earth metal C also comprising at least one hydroxide ion source, obtaining a gel, with the reaction mixture having the following molar composition:

$v\ AO_2{:}w\ BO_b{:}x\ C_{2/m}O{:}y\ H_2O$ with v being between 1 and 40,
with w being between 0.1 and 5,
with x being between 1 and 40,
with y being between 30 and 1000,
with b being between 1 and 3, b being a whole number or a rational number,
with m being equal to 1 or 2, ii) curing of the gel obtained at the end of (i) at a temperature of between −15° C. and 60° C., with or without stirring, for a time period of between 1 and 60 days, iii) after at least 3 days of curing, a step consisting of a one-time or repeated addition of at least one $AO_2$ source of at least one tetravalent element A that is silicon, germanium, or titanium, by itself or in a mixture, in said gel, with the molar composition of the gel at the end of the addition being as follows:

$vAO_2{:}wBO_b{:}xC_{2/m}O{:}yH_2O$ with v being between 5 and 50,
with w being between 0.1 and 5,
with x being between 1 and 40,
with y being between 200 and 1000,
with b being between 1 and 3, b being a whole number or a rational number,
with m being equal to 1 or 2, (iv) hydrothermal treatment of the gel that is obtained at the end of (iii) at a temperature of between 20° C. and 200° C., under autogenous reaction pressure, for a time period of between 1 hour and 14 days, to obtain crystallization of said FAU-structural nanometric zeolite Y.

2. The method according to claim 1, in which A is silicon.

3. The method according to claim 1, in which B is aluminum.

4. The method according to claim 1, in which C is sodium.

5. The method according to claim 1, in which the reaction mixture in (i) has the following molar composition:

$v\ AO_2{:}w\ BO_b{:}x\ C_{2/m}O{:}y\ H_2O$ with v being between 15 and 20,
with w being between 0.2 and 1.5,
with x being between 1 and 20,
with y being between 100 and 400,
with b being between 1 and 3, b being a whole number or a rational number,
with m being equal to 1 or 2,
where A, B and C have the same definition as above.

6. The method according to claim 1, in which seeds comprising FAU-structural zeolite crystals are added during mixing in (i).

7. The method according to claim 1, in which the tetravalent element A added in curing in (iii) is identical to the tetravalent element A that is added in mixing in (i).

8. The method according to claim 1, in which the one-time or repeated addition of at least one source of at least one tetravalent element A is carried out during the curing (ii).

9. The method according to claim 8, in which the one-time or repeated addition of at least one source of at least one tetravalent element A is carried out after at least 5 days of curing.

10. The method according to claim 1, in which the one-time or repeated addition of at least one source of at least one tetravalent element A is carried out after curing in (ii).

11. The method according to claim 1, in which the molar composition of the gel at the end of the addition in (iii) is as follows:

$v\ AO_2{:}w\ BO_b{:}x\ C_{2/m}O{:}y\ H_2O$ with v being between 20 and 30,
with w being between 0.2 and 1.5,
with x being between 1 and 20,
with y being between 200 and 500,
with b being between 1 and 3, b being a whole number or a rational number,
with m being equal to 1 or 2,
where A, B and C have the same definition as above.

12. The method according to claim 1, in which the FAU-structural nanometric zeolite Y that is formed at the end of (iv) is filtered, washed, and then dried at a temperature of between 20° C. and 150° C.

13. The method according to claim 12, in which said zeolite that is obtained at the end of drying undergoes at least one calcination and at least one ion exchange.

14. The method according to claim 1, in which the tetravalent element A added in curing in (iii) is different from the tetravalent element A that is added in mixing in (i).

15. The method according to claim 1, wherein (iii) consists of, after at least 3 days of curing, one time addition of and $AO_2$ source of one tetravalent element A.

16. A method for preparation of a FAU-structural nanometric zeolite Y that has a crystal size of less than 100 nm and an Si/Al ratio that is greater than 2, with said method consisting of:

i) mixing, in aqueous medium, of at least one $AO_2$ source of at least one tetravalent element A that is silicon, germanium, or titanium, by itself or in a mixture, at least one $BO_b$ source of at least one trivalent element B that is aluminum, boron, iron, indium, or gallium, by itself or in a mixture, at least one $C_{2/m}O$ source of an alkaline metal or alkaline-earth metal C that is lithium, sodium, potassium, calcium, or magnesium, by itself or in a mixture, with said $C_{2/m}O$ source of alkaline metal or alkaline-earth metal C also comprising at least one hydroxide ion source, obtaining a gel, with the reaction mixture having the following molar composition:

$v\ AO_2{:}w\ BO_b{:}x\ C_{2/m}O{:}y\ H_2O$ with v being between 1 and 40,
with w being between 0.1 and 5,
with x being between 1 and 40,
with y being between 30 and 1000,
with b being between 1 and 3, b being a whole number or a rational number,
with m being equal to 1 or 2, ii) curing of the gel obtained at the end of (i) at a temperature of between −15° C. and 60° C., with or without stirring, for a time period of between 1 and 60 days, iii) after at least 3 days of curing, a one-time or repeated addition of at least one $AO_2$ source of at least one tetravalent element A that is silicon, germanium, or titanium, by itself or in a mixture, in said gel, with the molar composition of the gel at the end of the addition being as follows:

$$v\ AO_2 : w\ BO_b : x\ C_{2/m}O : y\ H_2O$$

with v being between 5 and 50,
with w being between 0.1 and 5,
with x being between 1 and 40,
with y being between 200 and 1000,
with b being between 1 and 3, b being a whole number or a rational number,
with m being equal to 1 or 2, (iv) hydrothermal treatment of the gel that is obtained at the end of (iii) at a temperature of between 20° C. and 200° C., under autogenous reaction pressure, for a time period of between 1 hour and 14 days, to obtain crystallization of said FAU-structural nanometric zeolite Y.

* * * * *